United States Patent
Prasad

(10) Patent No.: US 7,237,216 B2
(45) Date of Patent: Jun. 26, 2007

(54) CLOCK GATING APPROACH TO ACCOMMODATE INFREQUENT ADDITIONAL PROCESSING LATENCIES

(75) Inventor: Nutan Prasad, San Jose, CA (US)

(73) Assignee: Infineon Technologies AG, Munich (DE)

( * ) Notice: Subject to any disclaimer, the term of this patent is extended or adjusted under 35 U.S.C. 154(b) by 282 days.

(21) Appl. No.: 10/370,053

(22) Filed: Feb. 21, 2003

(65) Prior Publication Data

US 2004/0168134 A1    Aug. 26, 2004

(51) Int. Cl.
*G06F 17/50* (2006.01)
*G06F 1/04* (2006.01)
*G06F 9/00* (2006.01)
*G06F 15/16* (2006.01)
*H03L 7/00* (2006.01)
*H03K 17/28* (2006.01)
*H03K 19/00* (2006.01)

(52) U.S. Cl. ............... 716/13; 716/9; 716/10; 716/14; 713/401; 713/601; 712/40; 712/229; 709/248; 327/149; 327/153; 327/158

(58) Field of Classification Search ........ 716/9, 716/10, 13, 14; 708/212; 712/24, 39, 40, 712/229, 300, 43; 709/248; 713/401, 601; 326/46, 47, 94, 101; 327/144, 149, 152, 327/153, 158, 392
See application file for complete search history.

(56) References Cited

U.S. PATENT DOCUMENTS

| 4,050,097 | A | * | 9/1977 | Miu et al. ............... 713/601 |
| 4,241,418 | A | * | 12/1980 | Stanley ................. 713/501 |
| 4,296,470 | A | * | 10/1981 | Fairchild et al. ........... 710/269 |
| 4,348,743 | A | * | 9/1982 | Dozier ................... 713/502 |
| 4,445,177 | A | * | 4/1984 | Bratt et al. .............. 712/245 |
| 4,447,877 | A | * | 5/1984 | Grondalski .............. 713/502 |

(Continued)

FOREIGN PATENT DOCUMENTS

| JP | 55103640 A | * | 8/1980 |
| JP | 04367034 A | * | 12/1992 |

OTHER PUBLICATIONS

NN9311397, "32-Bit Free Running Diagnostic Timer", IBM Technical Disclosure Bulletin, vol. 36, No. 11, Nov. 1993, pp. 397-400 (7 pages).*

(Continued)

*Primary Examiner*—Phallaka Kik
(74) *Attorney, Agent, or Firm*—Staas & Halsey LLP

(57) ABSTRACT

A processor system has a first device, a clock control circuit and a processor. The first device receives a clock signal, runs a plurality of operations including a lengthy operation requiring more than a single clock cycle to complete, and produces a control signal when the lengthy operation is activated. The clock control circuit receives the clock signal and outputs a gated clock signal only when the first device is not producing the control signal. The processor unit runs off of the gated clock signal. The first device may be a memory, and the lengthy operation may be correction of a soft error in memory. According to a second aspect, the first device requires a longer clock cycle rather than more clock cycles. The clock can be gated to effectively double the period when the lengthy operation is activated.

24 Claims, 2 Drawing Sheets

U.S. PATENT DOCUMENTS

| | | | | |
|---|---|---|---|---|
| 4,558,411 | A * | 12/1985 | Faber et al. | 712/37 |
| 4,623,981 | A * | 11/1986 | Wolrich et al. | 708/710 |
| 4,745,546 | A * | 5/1988 | Grinberg et al. | 712/11 |
| 4,748,559 | A * | 5/1988 | Smith et al. | 713/601 |
| 4,825,364 | A * | 4/1989 | Hyatt | 711/106 |
| 5,153,848 | A * | 10/1992 | Elkind et al. | 708/503 |
| 5,233,698 | A * | 8/1993 | Zuk | 713/601 |
| 5,560,017 | A * | 9/1996 | Barrett et al. | 710/260 |
| 5,710,911 | A * | 1/1998 | Walsh et al. | 713/500 |
| 5,724,280 | A * | 3/1998 | Davis | 708/628 |
| 5,742,842 | A * | 4/1998 | Suetake et al. | 712/3 |
| 5,771,376 | A * | 6/1998 | Hayakawa et al. | 712/220 |
| 5,870,621 | A * | 2/1999 | Walsh et al. | 712/32 |
| 5,920,888 | A * | 7/1999 | Shirotori et al. | 711/128 |
| 6,003,120 | A * | 12/1999 | Hardin | 711/169 |
| 6,041,401 | A * | 3/2000 | Ramsey et al. | 712/43 |
| 6,134,670 | A * | 10/2000 | Mahalingaiah | 713/401 |
| 6,268,749 | B1 * | 7/2001 | Fisch et al. | 327/147 |
| 6,311,263 | B1 * | 10/2001 | Barlow et al. | 712/36 |
| 6,643,829 | B1 * | 11/2003 | Borkovic et al. | 716/3 |
| 6,775,718 | B2 * | 8/2004 | Saruwatari et al. | 710/25 |
| 6,871,292 | B1 * | 3/2005 | Chan et al. | 713/500 |
| 6,907,552 | B2 * | 6/2005 | Collins | 714/700 |
| 6,988,218 | B2 * | 1/2006 | Drexler | 713/600 |
| 7,010,667 | B2 * | 3/2006 | Vorbach et al. | 712/10 |
| 7,069,422 | B2 * | 6/2006 | Modelski et al. | 712/210 |
| 2002/0083297 | A1 * | 6/2002 | Modelski et al. | 712/18 |
| 2002/0083313 | A1 * | 6/2002 | De Oliveira Kastrup Pereira et al. | 712/245 |
| 2003/0226002 | A1 * | 12/2003 | Boutaud et al. | 712/234 |
| 2005/0189971 | A1 * | 9/2005 | Kizer et al. | 327/147 |
| 2006/0143489 | A1 * | 6/2006 | Drexler | 713/401 |

OTHER PUBLICATIONS

Lotz et al., "A Quad-Issue Out-of-Order RISC CPU", 1996 IEEE International Solid-State Circuits Conference, Feb. 8, 1996, pp. 210-211,446.*

Park et al., "A 833 Mb/s 2.5 V 4 Mb Double Data Rate SRAM", 45th ISSCC 1998 IEEE International Solid-State Circuits Conference, Feb. 5, 1998, pp. 356-357,464.*

NN8905116, "Variable Duration Microprocessor Clock Generation", IBM Technical Disclosure Bulletin, vol. 31, No. 12, May 1989, pp. 116-123 (11 pages).*

Dosaka et al., "A 90-MHz 16-Mb System Integrated Memory with Direct Interface to CPU", IEEE Journal of Solid-State Circuits, vol. 31, No. 4, Apr. 1996, pp. 537-545.*

NN87045016, "Single-Bit Processor Enable Scheme", IBM Technical Disclosure Bulletin, vol. 29, No. 11, Apr. 1987, pp. 5016-5017 (4 pages).*

NB9002324, "Hardware Bring-Up Tool Using a LSSD Scanning Coupled With Dynamic Memory Functions", IBM Technical Disclosure Bulletin, vol. 32, No. 9B, Feb. 1990, pp. 324-332 (11 pages).*

NN9601217, "Power-Managing the PowerPC 601 CPU", IBM Technical Disclosure Bulletin, vol. 39, No. 1, Jan. 1996, pp. 217-220 (6 pages).*

NN9210425, "Technique for Power Management in Signal Processors", IBM Technical Disclosure Bulletin, vol. 35, No. 5, Oct. 1992, pp. 425-427 (5 pages).*

NB9011326, "Masked Delayed Branches for Pipelined Computer Processors", IBM Technical Disclosure Bulletin, vol. 33, No. 6B, Nov. 1990, pp. 326-331 (8 pages).*

NA900392, "Asynchronous Clock-Switching Network in LSSD Methodology", IBM Technical Disclosure Bulletin, vol. 32, No. 10A, Mar. 1990, pp. 92-94 (4 pages).*

NN8905116, "Variable Duration Microprocessor Clock Generation", IBM Technical Disclosure Bulletin, vol. 31, No. 12, May 1989, pp. 116-123 (10 pages).*

NN81092108, "Hybrid Timing Generator with Gated Clock Circuitry", IBM Technical Disclosure Bulletin, vol. 24, No. 4, Sep. 1981, pp. 2108-2109 (4 pages).*

NN76081054, "Execution Enhancement for Decimal Arithmetic", IBM Technical Disclosure Bulletin, vol. 19, No. 3, Aug. 1976, pp. 1054-1059 (6 pages).*

NN75032992, "Multiple Class Cycle Steal System", IBM Technical Disclosure Bulletin, vol. 17, No. 10, Mar. 1975, pp. 2992-3001 (13 pages).*

NN74121941, "Troubleshooting Large Scale Integrated Circuit Units", IBM Technical Disclosure Bulletin, vol. 17, No. 7, Dec. 1974, pp. 1941-1944 (7 pages).*

NN6508401, "Asynchronous Clock Gating", IBM Technical Disclosure Bulletin, vol. 8, No. 3, Aug. 1965, pp. 401-403 (5 pages).*

* cited by examiner

CLOCK GATING APPROACH TO ACCOMMODATE INFREQUENT ADDITIONAL PROCESSING LATENCIES

BACKGROUND OF THE INVENTION

FIG. 1 is a schematic view of a processor system architecture. The system has a central processor unit (CPU), which receives a clock. The CPU is connected to a memory block 50. Although there are various possible memory configurations, the block shown in FIG. 1 contains a random access memory (RAM), an error detection unit and an error correction unit. The processor system also includes other devices. For example, the device may have a peripheral, as shown in FIG. 1. The clock signal is supplied not only to the CPU, but also to the memory block 50 and the peripheral.

The clock system shown in FIG. 1, in which the system clock is distributed to all blocks, is typical. Sometimes, there is a task which cannot be completed in a single clock cycle clock. In this case, one of the blocks shown in FIG. 1 is slower than the other blocks. One example of such a task is correction of a soft error in a memory. A soft error in memory is an error caused when data in the memory gets corrupted. In this case, the data was correct when it was written in the memory. Subsequently, however, one or more bits of the memory became inverted, perhaps due to alpha radiation. A soft error in memory is detected, for example by the parity detection, only when the CPU reads from a location within the RAM of the memory block, and that location contains a soft error. To correct the error and make the corrected data available for the CPU requires one or more additional clock cycles.

Soft errors in memory are fairly rare. However, when they occur, they must be corrected, and an extra clock cycle is required to do this. The processor expects the memory to return the information in a single clock cycle. If the memory simply delays, problems will result in the processor pipeline, which is connected to memory interfaces.

One way to handle correction of soft errors in memory is to add wait states to the system. Wait states require additional logic and flip-flops to handle a hand shaking mechanism. The additional logic increases the size of the chip and affects speed. Adding wait states could also require changes to the architecture of the CPU or other blocks of the system.

SUMMARY OF THE INVENTION

The present inventor proposes a processor system having a first device, a clock control circuit and a processor. The first device receives a clock signal, runs a plurality of operations including a lengthy operation requiring more than a single clock cycle to complete, and produces a control signal when the lengthy operation is run. The clock control circuit receives the clock signal and outputs a gated clock signal only when the first device is not producing the control signal. The processor unit runs off of the gated clock signal.

The first device may be a memory, and the lengthy operation may be correction of a soft error in memory.

The control signal may be high when the lengthy operation is not activated and low when the lengthy operation is activated. The clock control circuit may include an AND gate.

The lengthy operation may require one to three extra clock cycles.

According to a second aspect of the invention, a processor system has an input, a first device, a clock control circuit and a processor unit. The input receives a first clock signal having a first period. The first device runs a plurality of operations including a lengthy operation requiring a clock cycle having a second period, longer than the first period, to complete. The first device produces a control signal when the lengthy operation is activated. The clock control circuit receives the first clock signal and outputs a gated clock signal only when the first device is not producing the control signal. Both the first device and the processor unit run off of the gated clock signal. The first device may be an interrupt control unit, which receives a plurality of interrupt signals, such that the lengthy operation occurs when one of the interrupt signals is received at the interrupt control unit. The second period may be ≦twice the first period.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
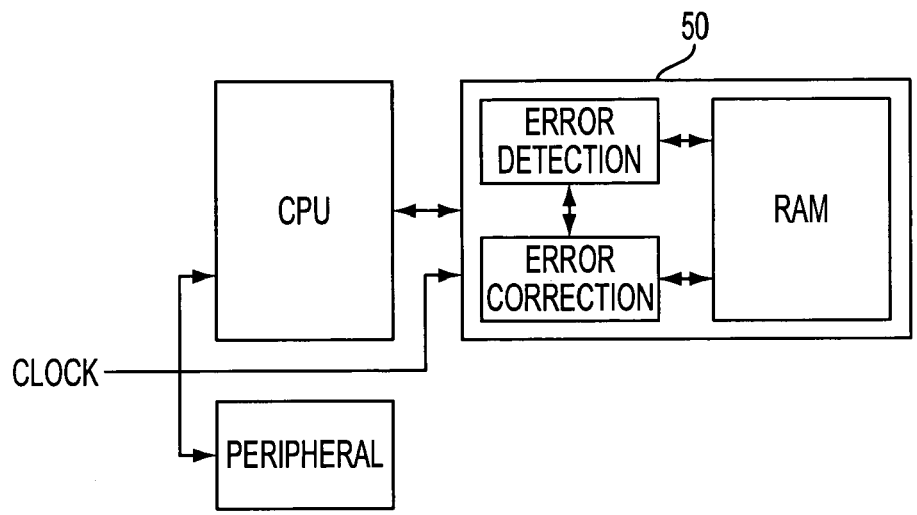
FIG. 1 is a schematic view of a processor system architecture.

Reference will now be made in detail to the preferred embodiments of the present invention, examples of which are illustrated in the accompanying drawings, wherein like reference numerals refer to like elements throughout.

Figure 2:
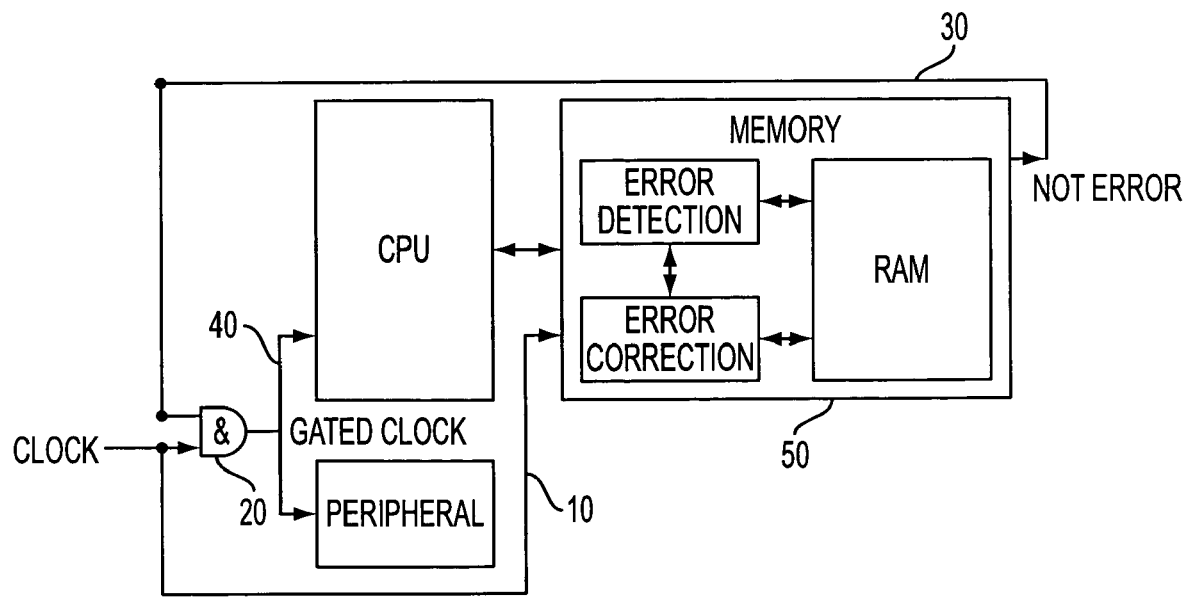
FIG. 2 is a schematic diagram of a clock gating scheme according to one aspect of the invention.

FIG. 2 is a schematic diagram of a clock gating scheme according to one aspect of the invention. FIG. 2 is similar to FIG. 1 in that it includes a CPU, a memory and a peripheral. It is important to understand that the configuration with the CPU and the memory is just one example of a possible implementation for the clock gating scheme. A similar scheme can be used to accommodate infrequent additional processing latencies in other blocks, which processing latencies have nothing to do with correction of soft errors in memory. In FIG. 1, the main clock was supplied to all blocks of the system. In FIG. 2, the main clock is supplied directly only to the memory block 50, via line 10. The clock signal supplied to the CPU and the peripheral are gated through an AND gate 20. In general, with this sort of clock gating scheme, a gated clock signal is supplied to all blocks of the system, except the block which requires an extra clock cycle.

The block that requires one or more extra clock cycles produces an output indicating when the extra clock cycles are required. In FIG. 2, a signal "Not Error" is produced on line 30. This signal is high normally, when there is no error, but becomes low when an error is detected. The Not Error signal would likely be present in the memory block without modification. If instead the memory block only produces an error signal, this error signal could simply be inverted. The Not Error signal on line 30 is fed to the AND gate 20 along with the system clock.

Figure 3:
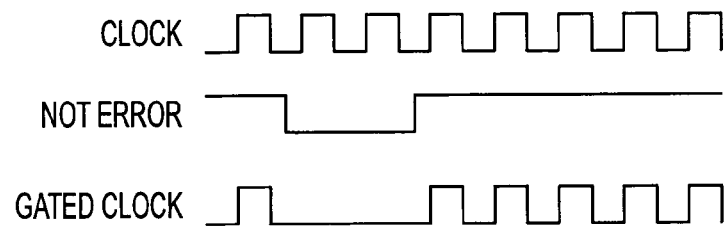
FIG. 3 is a timing diagram for the clock gating scheme shown in FIG. 2.

FIG. 3 is a timing diagram for the clock gating scheme shown in FIG. 2. FIG. 3 shows the timing of three signals, the clock signal, which is fed to the AND gate 20 and the memory block 50, the Not Error signal, which is produced on line 30 by the memory block 50 and a gated clock signal, which is produced by the AND gate 20 and fed to the CPU and the peripheral via line 40. In FIG. 3, when the Not Error signal is high, the gated clock signal follows the clock signal. When the Not Error signal becomes low, this indicates that a soft error in memory has been detected. Until the error is corrected and the Not Error signal once again becomes high, the gated clock signal stays low. In affect, this makes the blocks of the system, other than the memory block 50, have an extended clock period.

The clock gating scheme shown in FIG. 2 can be applied to other slow operations, which require more than a single clock cycle to accomplish a certain task.

Figure 4:
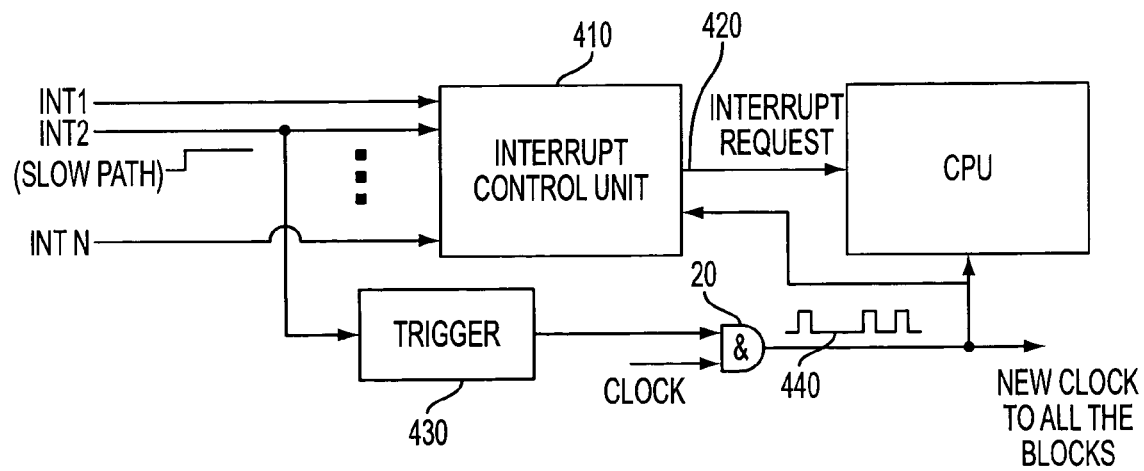
FIG. 4 is a schematic diagram of an interrupt system incorporating the clock gating scheme shown in FIG. 2.

A clock gating scheme similar to that shown in FIG. 2 can be applied to critical timing paths which require a single, longer clock cycle to accomplish a certain task. FIG. 4 is a schematic diagram of an interrupt system incorporating a clock gating scheme according to a second aspect of the invention. If a task on a critical timing path is rarely performed, it would be undesirable to increase the clock period and decrease the clock frequency to accommodate the task. Instead, when this task is activated, a signal can be generated, which signal is used to gate the clock signal for at least one period. A gated clock signal is used instead of the main clock signal. If the clock is gated off for one cycle, the clock period is effectively doubled while the slow task is being performed. This doubling occurs only when necessary, without affecting the frequency of the main clock. When the critical path is not activated, the system operates at a faster speed.

In FIG. 4, an interrupt control unit 410 receives a plurality of interrupt signals Int1, Int2, . . . , IntN. The interrupt control unit 410 determines whether the interrupt signals are valid. In addition, if two or more interrupt signals are simultaneously received, the interrupt control unit 410 performs arbitration to determine which interrupt signal has priority. After performing these tasks, an interrupt request is sent on line 420 to the CPU.

It is possible that one or more of the interrupt signals will take significantly more time to process than the other interrupt signals. In FIG. 4, Int2 is represented as the slow interrupt signal. Int2 would contribute to the critical path. Processing Int2 is performed in a single clock cycle, but the period of this clock cycle is longer than the period of the main clock cycle. One option would be to increase the period of the main clock signal. However, if Int2 is infrequently received, it would not be desirable to reduce the speed of the whole system to accommodate Int2.

The interrupt signal Int2 is used to control the clock in the same manner as the Not Error signal did in FIG. 2. For this purpose, the interrupt signal Int2 may be supplied directly to the AND gate 20. As an alternative, Int2 may be fed to a trigger generating unit 430, which is used when the interrupt signal Int2 itself cannot be used as an input to the AND gate 20. For example, whenever Int2 is produced, the trigger generating circuit 430 would produce a "0" for a single clock cycle. Otherwise, the trigger generating circuit 430 would produce a "1" as was done for the FIG. 2 device. The system clock is also supplied to the AND gate 420. The gated clock signal produced by the AND gate 20 is supplied to the interrupt control unit 410, the CPU and other blocks of the system. Reference numeral 440 shows where the gated clock signal is turned off because of interrupt 2 being activated.

Comparing the schemes shown in FIGS. 2 and 4, in FIG. 2, a plurality of extra clock cycles are required to accomplish a slow task. In FIG. 4, a single, longer clock cycle is required to accomplish the task. The extra clock cycles in FIG. 2 do not need to be extended. As long as there are one or more extra clock cycles for the task, it is acceptable for the extra clock cycles to be short. Thus, in FIG. 2, a non-gated clock signal is supplied to the device that needs extra cycle(s), and in FIG. 4, all devices shown receive the gated clock signal. In FIG. 2, the gated clock signal may be turned off for a plurality of cycles. On the other hand, in FIG. 4, a single extended clock cycle is usually sufficient.

Potential advantages associated with the clock gating scheme include that it is simple to implement. It may require less additional logic than required by other approaches. It may be possible to implement the clock gating scheme without changing the architecture of the rest of the system. The clock gating scheme according to the second aspect eliminates a critical path so that it does not affect the performance of the system. The performance is affected only when the lengthy task is activated, which may be rare.

The invention has been described in detail with particular reference to preferred embodiments thereof and examples, but it will be understood that variations and modifications can be effected within the spirit and scope of the invention.

What is claimed is:

1. A control system, comprising:
   a first device configured to receive a first clock signal having a first clock cycle, and run an operation that requires more than the first clock cycle to complete, and to produce a control signal as long as the operation is activated; and
   a control circuit configured to extend a first duration of the first clock cycle to a time sufficient for the first device to complete the operation whenever the control signal is asserted by the first device.

2. The control system of claim 1, wherein the control circuit extends the duration of the first clock cycle by inhibiting the first clock signal for the time sufficient to complete the operation.

3. The control system of claim 1, wherein the time sufficient to complete the operation is equal to or greater than two of the first clock cycles.

4. The control system of claim 1, wherein the first device receives requests to perform operations, wherein one or more of the requests for one or more of the operations that cannot be completed by the first device within the first clock cycles are provided to the control circuit via one or more corresponding paths, and wherein every time that the one or more of the requests is received on the one or more corresponding paths, the control circuit increases the duration of the first clock cycle from the first durations to the time sufficient to complete the operation which is equal to or greater than two of the first cycles.

5. The control system of claim 1, further comprising a second device configured to receive the first clock signal.

6. The control system of claim 5, wherein the second device is configured to receive requests for the first device to perform operations, and wherein if two or more of the requests are received at the same time, the second device sends a one of the two or more requests which has a highest priority to the first device.

7. The control system of claim 1, wherein the first device is a processor and the operation is an interrupt request.

8. A control system, comprising:
   a first device configured to receive a first clock signal having a first clock cycle and to provide an output of the first device which indicates an operation is not complete when the operation cannot be completed by the first device within the first clock cycle; and a second device configured to receive the first clock signal when the output of the first device is not provided and to receive a second clock signal which has a second clock cycle with a duration sufficient for the first device to complete the operation when the output is provided.

9. The control system of claim 8, further comprising a control circuit configured to generate the second clock signal from the first clock signal by inhibiting the first clock signal for at least the time to complete the operation.

10. The control system of claim 8, wherein the first device is a processor.

11. The control system of claim 8, wherein the operation is a processing of an interrupt request.

12. The control system of claim 8, further comprising a third device configured to receive the first clock signal when the output of the first device is not provided and to receive the second clock signal when the output of the first device is provided.

13. A control system, comprising:
   a processor;
   a control unit which receives requests at corresponding inputs to perform operations and transfers the requests to the processor, wherein if two or more of the requests are received at the same time, the control unit transfers one of the two or more requests which has a highest priority to the processor; and
   a clock circuit configured to provide a clock signal to the processor, wherein the clock circuit increases a period of the clock signal when a predetermined one or more of the requests are received by the control unit.

14. The control system of claim 13, wherein the clock circuit increases the period of the clock signal by inhibiting the clock signal whenever the predetermined one or more of the requests are present at the corresponding inputs of the control unit.

15. The control system of claim 13, wherein the clock circuit includes a trigger circuit that increases the period of the clock signal by asserting an output that inhibits the clock signal when the predetermined one or more of the requests are received by the control unit.

16. The control system of claim 15, further comprising a logic circuit that is
   configured to receive the clock signal and the output of the trigger circuit, wherein the logic circuit inhibits the clock signal from being provided to the processor when the trigger circuit asserts the output.

17. A method of providing a clock, comprising:
   providing a first clock signal having a first clock cycle to a first device;
   running an operation that requires more than the first clock cycle to complete;
   producing a control signal as long as the operation is activated;
   increasing a period of the first clock cycle to a time sufficient to complete the operation whenever the control signal is asserted by the first device.

18. The method of claim 17, wherein increasing the period of the first clock signal comprises inhibiting the first clock signal for the time sufficient to complete the operation.

19. The method of claim 17, wherein providing the first clock signal comprises providing the first clock signal to a second device.

20. The method of claim 17, comprising:
   receiving requests to perform operations, wherein one or more of the operations corresponding to one or more of the requests cannot be completed by the first device within the first clock cycle; and
   increasing the period of the first clock signal every time the one or more of the requests are received.

21. The method of claim 20, wherein receiving requests to perform operations comprises, if two or more of the requests are received at the same time, sending a one of the two or more of the requests which has a highest priority to the first device.

22. A method of providing a clock to a first device and a second device, comprising:
   providing a first clock signal having a first clock cycle to the first device and to the second device;
   asserting an output of the first device as long as the first device has not completed an operation within the first clock cycle; and
   providing a second clock signal to the second device as long as the output of the first device is asserted, wherein the second clock signal has a period that is equal to or greater than the time to complete the operation.

23. The method of claim 22, wherein providing the second clock signal comprises generating the second clock signal from the first clock signal by inhibiting the first clock signal for at least the time to complete the operation.

24. A control system, comprising:
   a first processing means configured to receive a first clock signal and provide an output which indicates a time to complete an operation when the operation cannot be completed by the first processing means within a period of the first clock signal;
   a second logic means configured to receive the first clock signal when the output of the first processing means is not provided and to receive a second clock signal when the output of the first processing means is provided; and
   a control means configured to generate the second clock signal from the first clock signal by inhibiting the first clock signal for the period that is equal to or greater than the time to complete the operation.

* * * * *

UNITED STATES PATENT AND TRADEMARK OFFICE
CERTIFICATE OF CORRECTION

| | |
|---|---|
| PATENT NO. | : 7,237,216 B2 |
| APPLICATION NO. | : 10/370053 |
| DATED | : June 26, 2007 |
| INVENTOR(S) | : Nutan Prasad |

It is certified that error appears in the above-identified patent and that said Letters Patent is hereby corrected as shown below:

Column 4, Line 45, change "cycles" to --cycle--.

Column 4, Line 49, change "durations" to --duration--.

Signed and Sealed this

Thirtieth Day of October, 2007

JON W. DUDAS
*Director of the United States Patent and Trademark Office*